(12) United States Patent
Liu

(10) Patent No.: US 11,113,805 B2
(45) Date of Patent: Sep. 7, 2021

(54) AUTOMATIC ATTACHING 3D TEMPERED GLASS SCREEN PROTECTOR ATTACHING MACHINE

(71) Applicant: Wing Tak Lee Silicone Rubber Technology (Shenzhen) Co., Ltd., Shenzhen (CN)

(72) Inventor: Tak Nam Liu, Shenzhen (CN)

(*) Notice: Subject to any disclaimer, the term of this patent is extended or adjusted under 35 U.S.C. 154(b) by 0 days.

(21) Appl. No.: 16/846,469

(22) Filed: Apr. 13, 2020

(65) Prior Publication Data
US 2021/0166371 A1   Jun. 3, 2021

(30) Foreign Application Priority Data

Jul. 2, 2019   (CN) .......................... 201910591532.X

(51) Int. Cl.
| | | |
|---|---|---|
| G06T 7/00 | (2017.01) | |
| G06T 7/90 | (2017.01) | |
| G06F 1/16 | (2006.01) | |
| G06N 3/08 | (2006.01) | |
| G06T 7/60 | (2017.01) | |

(52) U.S. Cl.
CPC .......... *G06T 7/0004* (2013.01); *G06F 1/1626* (2013.01); *G06N 3/08* (2013.01); *G06T 7/60* (2013.01); *G06T 7/90* (2017.01); *G06F 2200/1634* (2013.01)

(58) Field of Classification Search
CPC . G06T 7/0004; G06T 7/90; G06T 7/60; G06F 1/1626; G06F 2200/1634; G06N 3/08; B29C 63/0004; B29C 63/0056; B29C 63/02
See application file for complete search history.

(56) References Cited

U.S. PATENT DOCUMENTS

| | | | |
|---|---|---|---|
| 10,730,278 B1* | 8/2020 | Zeng ................. | B32B 38/10 |
| 2017/0372465 A1* | 12/2017 | Forutanpour ......... | G06T 7/0004 |
| 2018/0281274 A1* | 10/2018 | Lin ..................... | B29C 63/02 |

FOREIGN PATENT DOCUMENTS

| | | | |
|---|---|---|---|
| CN | 202507645 | * | 2/2012 |
| CN | 210026295 | * | 11/2015 |
| CN | 110856975 | * | 8/2018 |
| CN | 111319248 | * | 12/2018 |
| WO | WO 2015/035679 | * | 3/2015 |

* cited by examiner

*Primary Examiner* — Qian Yang
(74) *Attorney, Agent, or Firm* — Rumit Ranjit Kanakia

(57) ABSTRACT

An automatic attaching 3D tempered glass screen protector attaching machine, comprising an identification device, wherein the identification device comprises: a processor, a camera and a memory; the camera is configured to collect a front picture and a back picture of the mobile phone; the processor is configured to identify the back picture to determine the brand of the mobile phone, and identify the front picture to determine the model of the mobile phone; and further determine the category of the screen protector according to the brand and model of the mobile phone, and send the category to the attaching mechanism to complete attaching the screen protector.

6 Claims, 6 Drawing Sheets

| Slope Template Vector | | Slope Feature Vector |
|---|---|---|
| k20 | | k10 |
| k21 | | k11 |
| k22 | − | k12 |
| k23 | | k13 |
| k24 | | k14 |
| k25 | | |
| k26 | | |
| k27 | | |
| k28 | | |
| k29 | | |
| k30 | | |

FIG. 2D

AUTOMATIC ATTACHING 3D TEMPERED GLASS SCREEN PROTECTOR ATTACHING MACHINE

CROSS REFERENCE TO RELATED APPLICATION

The present application claims priority to Chinese patent application No. 201910591532.X, entitled "AUTOMATIC ATTACHING 3D TEMPERED GLASS SCREEN PROTECTOR ATTACHING MACHINE", filed on Jul. 2, 2019, the entire content of which is incorporated herein by reference.

TECHNICAL FIELD

The present application relates to the field of electronic accessories, and in particular to an automatic attaching 3D tempered glass screen protector attaching machine.

BACKGROUND

The protective film can be divided into digital product protective film, automobile protective film, household protective film, food preservation film, etc. according to the application. With the development of electronic equipment, especially the growth of mobile phone use frequency, the demand for mobile phone film (i.e., screen protector) has also increased, the previous screen protector is installed manually, which is not only poor in quality, but also high in cost, and the cost of manually installing the screen protector is often more than ten times the price of the screen protector itself.

In order to improve the quality of installing the screen protector and reduce the labor cost, an automatic screen protector attaching machine is invented, for example, the Chinese patent CN206679333U provides an automatic screen protector attaching machine, but the existing automatic screen protector attaching machine cannot determine the model of the mobile phone, which requires the user to manually enter the model of the mobile phone when installing the screen protector, however, sometimes the user does not know the model of the mobile phone, which leads to the limitation of the application scenario of the automatic screen protector attaching machine and influences the user experience.

SUMMARY

The embodiment of the present application provides an automatic attaching 3D tempered glass screen protector attaching machine, which can realize automatic identification of the mode of the mobile phone and improve user experience.

The first embodiment of the present application provides an automatic attaching 3D tempered glass screen protector attaching machine, comprising a cleaning mechanism, an attaching mechanism and an evacuating mechanism, wherein the automatic screen protector attaching machine further comprises an identification device, the identification device comprises: a processor, a camera and a memory;

the camera, is configured to collect a front picture and a back picture of the mobile phone;

the processor, is configured to identify the back picture to determine the brand of the mobile phone, and identify the front picture to determine the model of the mobile phone; and further determine the category of the screen protector according to the brand and model of the mobile phone, and send the category to the attaching mechanism to complete attaching the screen protector.

The second embodiment of the present application provides an identification method, which is applied to the above automatic attaching 3D tempered glass screen protector attaching machine, comprising the following steps:

collect the front picture and the back picture of the mobile phone;

identify the back picture to determine the brand of the mobile phone, and identify the front picture to determine the model of the mobile phone;

determine the category of the screen protector according to the brand and model, and send the category to the attaching mechanism to complete the attaching process of the screen protector.

The embodiments of the present application have the following beneficial effects:

it can be seen that the technical solution provided in the application is to determine the brand and model of the mobile phone by collecting and identifying the front picture and the back picture, determine the category of the screen protector according to the brand and model, then send the category to the attaching mechanism, and attach the screen protector after the reclaiming device grabs the corresponding screen protector according to the category.

BRIEF DESCRIPTION OF THE DRAWINGS

In order to more clearly illustrate the technical solutions in the embodiments of the present application, drawings used in the description of the embodiments will be briefly described below, obviously, the drawings in the following description are some embodiments of the present application, those of ordinary skill in the art can also obtain other drawings based on these drawings without any creative efforts.

FIG. 2D is a schematic diagram of a slope template vector provided by the present application.

DESCRIPTION OF THE EMBODIMENTS

The technical solution in the embodiments of the present application is clearly and completely described below with reference to the accompanying drawings in the embodiments of the present application, obviously, the described embodiments are a part of the embodiments of the present application, rather than all of the embodiments. All other embodiments obtained by those of ordinary skill in the art based on the embodiments of the present application without paying any creative efforts are within the scope of protection of the present application.

The terms, such as "first", "second", "third", "fourth", etc., in the specification, claims and the accompanying drawings of the present application are used to distinguish different objects, and are not intended to describe a specific order. Furthermore, the terms "comprise", "have" and any variations thereof are intended to cover a non-exclusive inclusion. For example, a process, method, system, product, or device that comprises a series of steps or units is not limited to the listed steps or units, but alternatively comprises steps or units that are not listed, or alternatively comprises other steps or units inherent to these processes, methods, products or devices.

References to "an embodiment" herein mean that a particular feature, structure, or characteristic described in connection with the embodiments can be included in at least one embodiment of the present application. The appearances of the phrase in various places in the specification are not necessarily referring to the same embodiments, and are not exclusive or alternative embodiments that are mutually exclusive from other embodiments. Those skilled in the art will explicitly and implicitly understand that the embodiments described herein can be combined with other embodiments.

Figure 1:
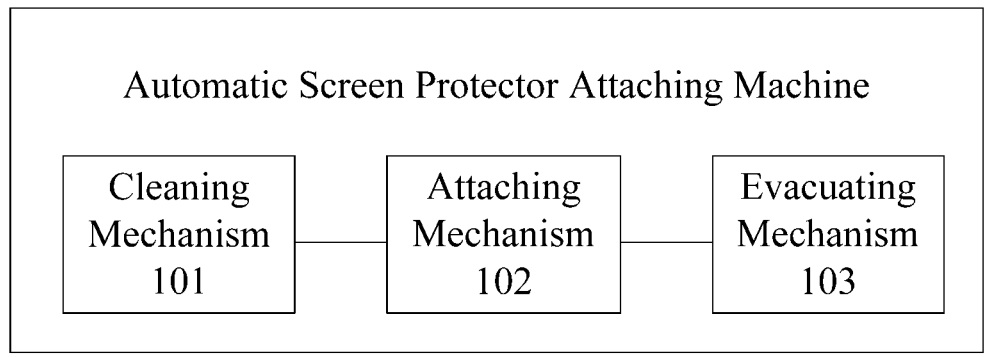
FIG. 1 is a schematic structural diagram of an automatic attaching 3D tempered glass screen protector attaching machine provided by an embodiment of the present application.

Referring to FIG. 1, FIG. 1 provides a structural block diagram of an automatic screen protector attaching machine for mobile phone, as shown in FIG. 1, the automatic screen protector attaching machine for mobile phone comprises: a cleaning mechanism 101, an attaching mechanism 102 and an evacuating mechanism 103, wherein the attaching mechanism 102 can be further divided into a protector tearing film device, a servo centering device (i.e., attaching device) and a reclaiming device. For screen protector attaching, the key is to obtain the mobile phone model, for the mobile phone model, there are many mobile phone models, different mobile phone model corresponds to different screen protector, thus the identification of the mobile phone model is of great significance for automatic screen protector attaching machine. The above-mentioned cleaning mechanism 101, the attaching mechanism 102 and the evacuating mechanism 103 may adopt a conventional structure, and details are not described herein.

Figure 2A:
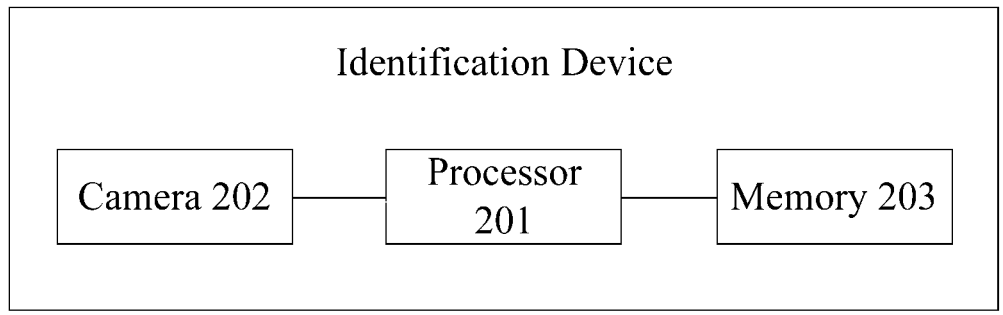
FIG. 2A is a schematic structural diagram of an identification device provided by the present application.

Referring to FIG. 2A, FIG. 2A shows an automatic screen protector attaching machine, the automatic screen protector attaching machine comprises an identification device, the identification device comprises: a processor 201, a camera 202 and a memory 203, wherein the camera and the memory are both connected to the processor, the above camera may be disposed above and below relatively the passage of the cleaning mechanism 101, and may take pictures of both the front and back of the mobile phone.

The camera 202 is configured to collect a front picture and a back picture of the mobile phone;

the processor 201 is configured to identify the back picture to determine the brand of the mobile phone, and identify the front picture to determine the model of the mobile phone; and further determine the category of the screen protector according to the brand and model of the mobile phone, and send the category to the attaching mechanism to complete the attaching process of the screen protector.

The technical solution provided in the application is to determine the brand and model of the mobile phone by collecting and identifying the front picture and the back picture, determine the category of the screen protector according to the brand and model, then send the category to the attaching mechanism, and attach the screen protector after the reclaiming device grabs the corresponding screen protector according to the category.

Figure 3:
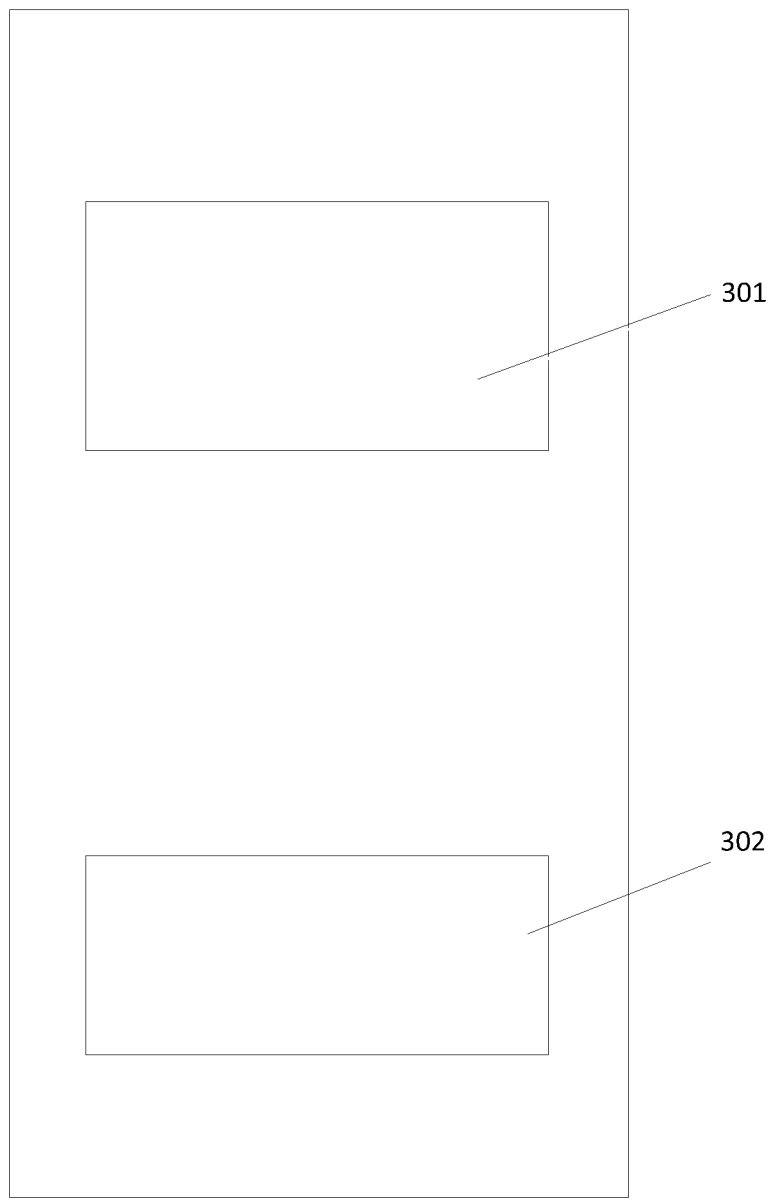
FIG. 3 is a schematic diagram of a setting area provided by the present application.

Alternatively, the above identify the back picture to determine the brand of the mobile phone may specifically comprise:

the processor 201 is specifically configured to capture the first picture in a setting area of the back picture, identify the text of the first picture and determine the brand of the mobile phone. There can be more than one setting area, the logo of the brand of the mobile phone is generally located in two areas, such as the 301 area shown in FIG. 3 (taking the brand oppo as an example), the setting area is the upper middle area, and such as the 302 area shown in FIG. 3 (taking the brand Xiaomi as an example), the setting area can also be the lower middle area. In addition, the above-mentioned setting area may be other areas.

The specific identification method may comprise: identifying all pixels of the first picture to determine the RGB value of each pixel, counting the number of each RGB value, deleting the pixel with the largest number of RGB value from the first picture to obtain the second picture, comparing the second picture with the trademark in the trademark image database one by one to determine the brand of the mobile phone.

This identification method is suitable for mobile phones with a solid color on the back, for solid color mobile phones, the color on the back is the same, so the RGB values of large area pixels are the same, furthermore, the design of the back of the mobile phone is relatively simple, and the present technical solution merely extracts the picture of the setting area and avoids the interference of other noise pixels, so after removing the pixels of the back color, only the pixels of the mobile phone model are retained, so that the brand of the mobile phone can be determined by comparing it with the trademark in the trademark image database one by one, wherein the trademark in the trademark image database can be the brand supported by the present automatic screen protector attaching machine and its number is relatively limited, because the automatic screen protector attaching machine cannot support all brands, it is enough to retain limited brands, such as HUAWEI, MI, OPPO, VIVO , IPHONE and other brands.

Of course, the above method may further comprise: a processor, which is further configured to control the cleaning mechanism to return the mobile phone if the brand of the mobile phone is not identified in the setting area. A specific implementation manner may be as follows: because the automatic screen protector attaching machine cannot support the mobile phone, the mobile phone is exited by controlling the transfer motor of the cleaning mechanism to reverse.

For mobile phones with a gradient color on the back, an artificial intelligence recognition method can be applied to determine the text in the picture, and then the text is compared with the trademark in the trademark image database to determine the brand of the mobile phone corresponding to the text.

The above identify the front picture to determine the model of the mobile phone may specifically comprise:

the processor is specifically configured to perform grayscale processing on the front picture to obtain a grayscale image, form a grayscale image matrix [H] [W] according to the grayscale image, and perform a multi-layer convolution operation on the matrix [H] [W] to obtain a convolution result, and compare the convolution result with the template one by one to determine the first template with the smallest difference from the convolution result, and determine the first model corresponding to the first template as the mode of the mobile phone. The convolution kernel of each layer of the above multi-layer convolution operation is different, and the convolution kernels are all fixed convolution kernels, for example, the multi-layer convolution kernel may be a 3-layer convolution kernel, and the first-layer convolution kernel may be a 3*3 convolution kernel, the second-layer convolution kernel can be a 4*4 convolution kernel, and the third-layer convolution kernel can be a 5*5 convolution kernel. The purpose of setting a multi-layer convolution kernel is to make the size of the convolution result small, which is easy to be compared with the template. Wherein the [H] represents the column values of the matrix, and the [W] represents the row values of the matrix.

The method for determining the above smallest difference may be as follows: calculating an average of the differences after performing a difference operation between the convolution result and the element value of each template, and determining the template with the smallest average and less than the difference threshold as the first template with the smallest difference.

Figure 2B:
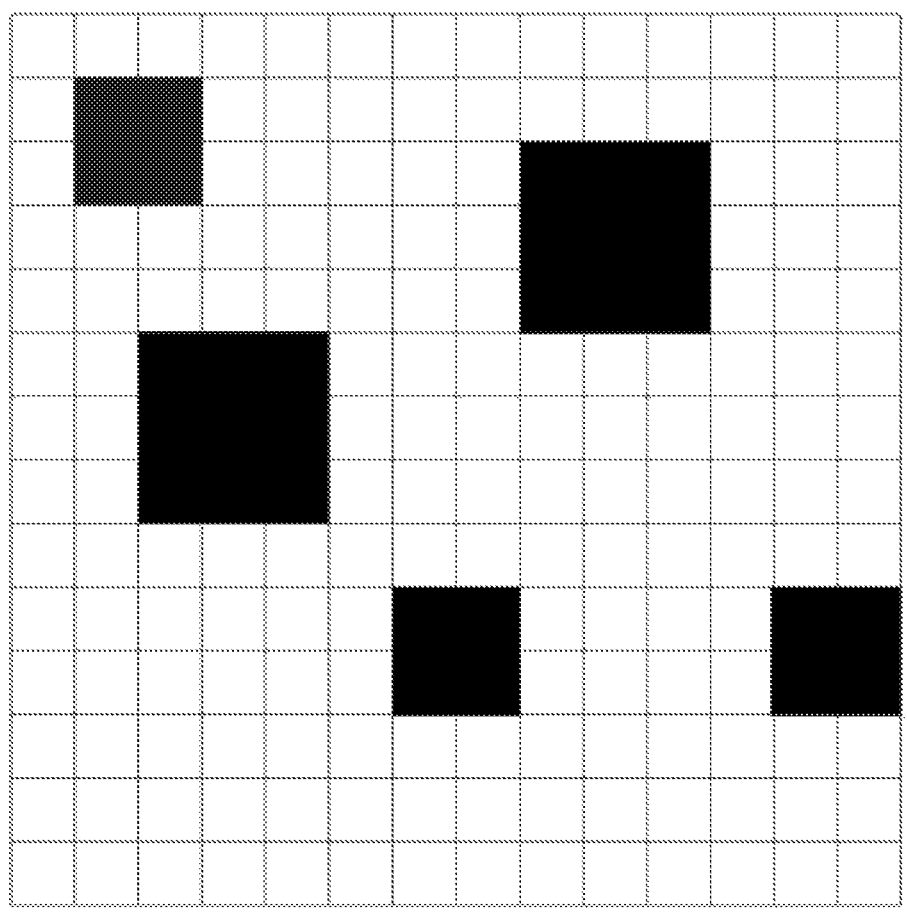
FIG. 2B is a schematic diagram of a calculation result provided by the present application.
Figure 2C:
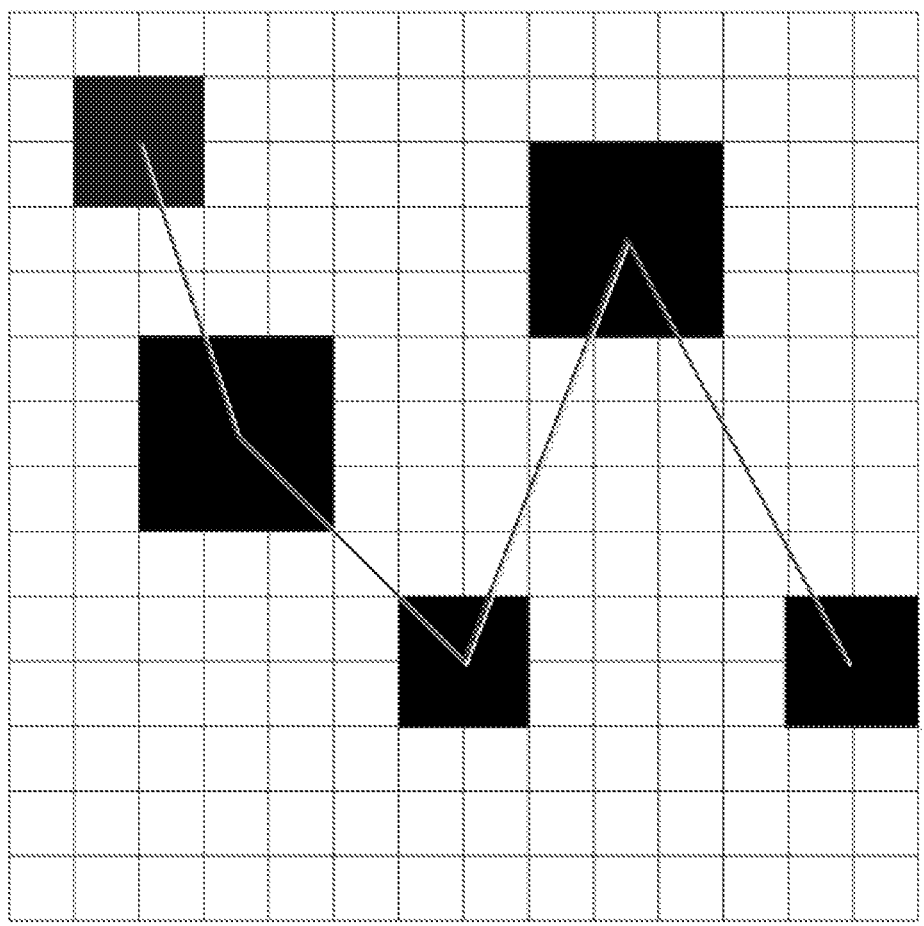
FIG. 2C is a schematic diagram of a feature curve provided by the present application.

The above identify the back picture to determine the brand of the mobile phone may specifically comprise:

the processor is specifically configured to generate the first input data according to the back picture (the first back picture can be obtained according to the gray value or RGB value of each pixel of the back picture), perform the multi-layer convolution operation of the neural network on the first input data to obtain the operation result matrix, retain the element values in the operation result matrix that are greater than the feature threshold to obtain the feature map of the operation result matrix (as shown in FIG. 2B, each box represents an element, wherein the black box is the element value greater than the feature threshold), set the adjacent elements in the feature map as a feature area (as shown in the black area in FIG. 2B), and the number of elements in the feature area is greater than the number threshold, extract the center position of each feature area, connect the center positions of all feature areas with straight lines to obtain a feature curve (as shown in FIG. 2C), and compare the feature curve with a template curve of a preset brand template to determine whether the feature curve is similar to partial areas of the template curve, if it is determined that the feature curve is similar to partial areas of the template curve, then it is determined that the brand of the mobile phone is the preset brand.

Alternatively, the above compare the feature curve with a template curve of a preset brand template to determine whether the feature curve is similar to partial areas of the template curve may comprise:

extracting the slope of each straight line in the feature curve, combining the slopes into a slope feature vector in order, extracting the slope of each straight line in the template curve, combining the slopes into a slope template vector in order, and sequentially extracting partial vectors with the same size to the slope feature vector from the slope template vector (as shown by the dashed line in FIG. 2D), calculating the difference between each partial vector and the slope feature vector to obtain multiple differences (as shown in FIG. 2D, seven partial vectors can be extracted, that is, seven differences can be calculated and obtained), and extracting the minimum value of multiple differences, if the minimum value is greater than the similar threshold, it is determined that the feature curve is not similar to partial areas of the template curve after comparing the feature curve with a template curve of a preset brand template, if the minimum value is less than or equal to the similar threshold, then it is determined that the feature curve is similar to partial areas of the template curve after comparing the feature curve with a template curve of a preset brand template.

The technical solution of the present application can realize identification of a partial brand picture. In the scenario of brand identification, the requirement for the collection of template picture is high, so the template picture contains all the characteristic information of the brand. However, for the captured pictures on the back, due to the angle captured by the camera or the target object itself, it is possible that only partial brand picture is collected, resulting in the poor accuracy of the comparison between partial brand picture and template picture, in view of the above, the applicant obtained the following characteristics after analyzing and determining the operation results of the neural network. Because partial brand picture and template brand image belong to the same brand, the characteristics of partial brand picture are merely some of the characteristics of template brand picture, such as "op" in OPPO and other characteristics, these characteristics are calculated to obtain the convolution operation results, the trends thereof are similar, but if there are fewer such similarities, the fewer similarities will be weakened after the full connection operation of the existing neural network model, so that the comparison cannot be achieved, however, the technical solution of the present application is comparing and determining directly according to the results of the convolution operation, and the feature curve is relatively compared with multiple areas of the template curve to determine, even if there are fewer features, the identification can be achieved, therefore the technical solution of the present application can weaken the angle captured by the camera and improve the accuracy of brand identification.

Figure 4:
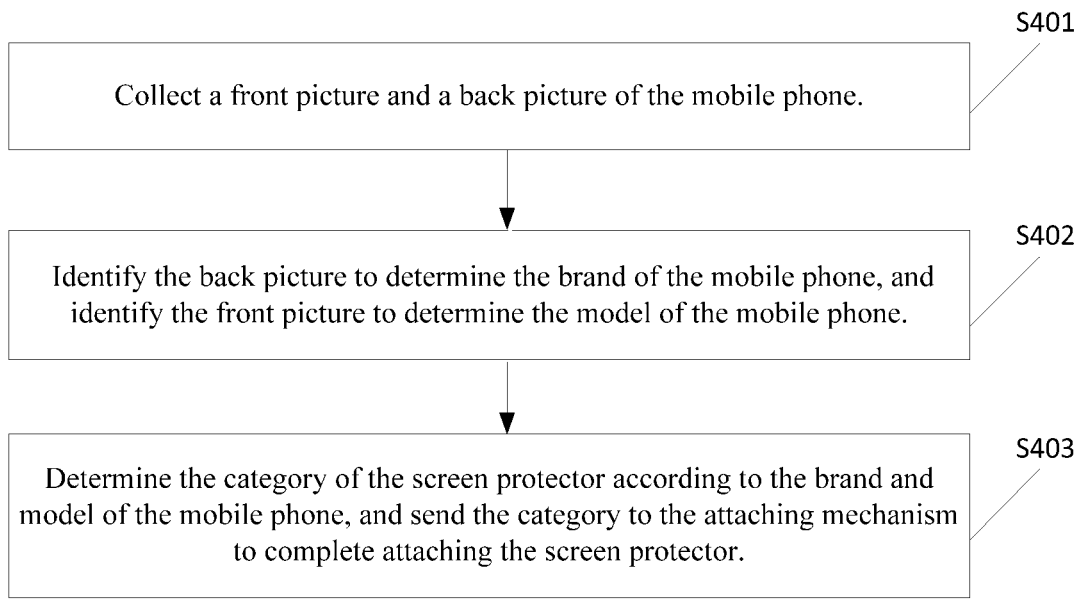
FIG. 4 is a schematic flowchart of an identification method provided by the present application.

In the above embodiments, the description of each embodiment has different emphases, for the part not described in detail in one embodiment, please refer to the relevant description in other embodiments. As shown in FIG. 4, the present application further provides an identification method, which is applied to the above automatic attaching 3D tempered glass screen protector attaching machine, comprising the following steps: S401: collect the front picture and the back picture of the mobile phone; S402: identify the back picture to determine the brand of the mobile phone, and identify the front picture to determine the model of the mobile phone; S403: determine the category of the screen protector according to the brand and model, and send the category to the attaching mechanism to complete the attaching process of the screen protector.

Figure 5:
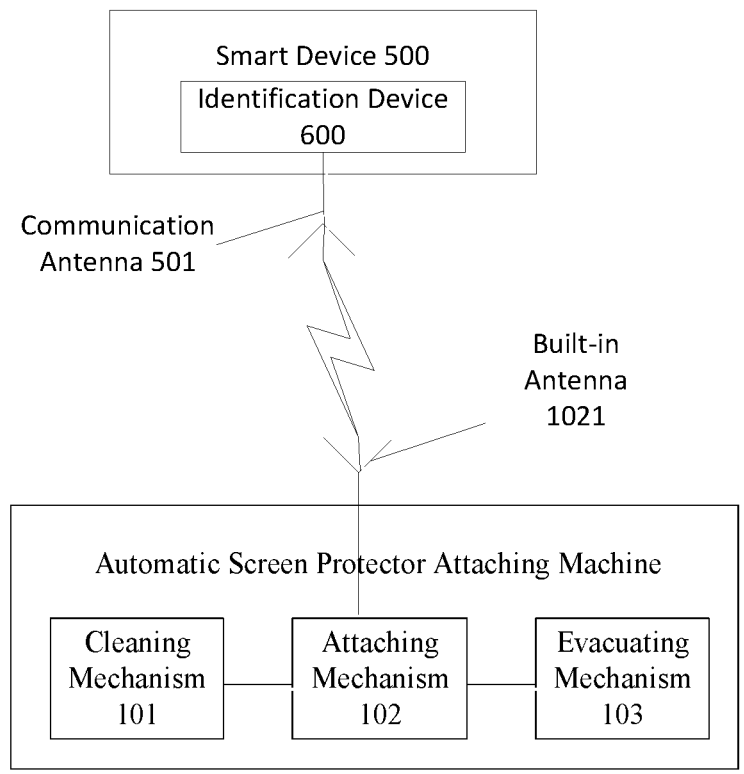
FIG. 5 is a schematic structural diagram of a smart device provided by the present application.

As shown in FIG. 5, the present application further provides a smart device 500, the smart device may comprise the above-mentioned identification device 600, the specific structure of the identification device may be specifically described in the embodiments shown in FIG. 1 and FIG. 2A, and is not repeated here, the smart device may comprise a communication antenna 501, which is connected with a built-in antenna 1021 of the attaching mechanism of the automatic attaching 3D tempered glass screen protector attaching machine, the connection method comprises, but is not limited to, Bluetooth connection, radio frequency connection, etc.

In the several embodiments provided in the present application, it should be understood that the disclosed device may be implemented in other ways. For example, the device embodiments described above are merely illustrative. For example, the division of the unit is only a logical function division. In actual implementation, there may be another division manner. For example, multiple units or components may be combined or integrated into another system, or some features can be ignored or not implemented. In addition, the displayed or discussed mutual coupling or direct coupling or communication connection may be through some interfaces, the indirect coupling or communication connection of the device or unit may be electrical or other forms.

The units described as separate components may or may not be physically separated, and the components displayed as units may or may not be physical units, that is, may be located in one place, or may be distributed on multiple network units. Some or all of the units may be selected according to actual needs to achieve the objective of the solution of the present embodiment.

In addition, each functional unit in each embodiment of the present application may be integrated into one processing unit, or each of the units may exist separately physically, or two or more units may be integrated into one unit. The above integrated unit may be implemented in the form of hardware or in the form of software program modules.

Those of ordinary skill in the art may understand that all or part of the steps in the various methods of the above-mentioned embodiments may be completed by a program instructing the corresponding hardware, the program may be stored in a computer-readable memory, and the memory may include: a flash disk, read-only memory (i.e., ROM), random access device (i.e., RAM), magnetic disks or compact discs, etc.

The embodiments of the present application have been described in detail above, specific examples are used in this document to explain the principles and implementation of the present application, the descriptions of the above embodiments are only used to help understand the method and core ideas of the present application; at the same time, persons of ordinary skill in the art may change the specific implementation and application scope based on the idea of the present application, in summary, the content of this description should not be construed as a limitation on the present application.

What is claimed is:

1. An automatic attaching 3D tempered glass screen protector attaching machine comprising an identification device, wherein the identification device comprises: a processor, a camera and a memory;
   the camera is configured to collect a front picture and a back picture of the mobile phone;
   the processor is configured to identify the back picture to determine the brand of the mobile phone, identify the front picture to determine the model of the mobile phone, and determine the category of the screen protector according to the brand and model of the mobile phone, and send the category to the attaching mechanism to complete attaching the screen protector.

2. The automatic attaching 3D tempered glass screen protector attaching machine of claim 1, wherein the processor is configured to capture a first picture in a setting area of the back picture, and identify the text of the first picture and determine the brand of the mobile phone.

3. The automatic attaching 3D tempered glass screen protector attaching machine of claim 1, wherein the processor is configured to identify all pixels of the first picture to determine the RGB value of each pixel, count the number of each RGB value, delete the pixel with the largest number of RGB value from the first picture to obtain a second picture, and compare the second picture with the trademark in the trademark image database one by one to determine the brand of the mobile phone.

4. The automatic attaching 3D tempered glass screen protector attaching machine of claim 1, wherein the processor is configured to perform grayscale processing on the front picture to obtain a grayscale image, form a grayscale image matrix [H] [W] according to the grayscale image, perform a multi-layer convolution operation on the matrix [H] [W] to obtain a convolution result, and compare the convolution result with the template one by one to determine a first template with the smallest difference from the convolution result, and determine a first model corresponding to the first template as the mode of the mobile phone.

5. The automatic attaching 3D tempered glass screen protector attaching machine of claim 1, wherein the processor is configured to generate a first input data according to the back picture, perform the multi-layer convolution operation of the neural network on the first input data to obtain the operation result matrix, retain the element values in the operation result matrix that are greater than a feature threshold to obtain the feature map of the operation result matrix, set the adjacent elements in the feature map as a feature area wherein the number of elements in the feature area is greater than a number threshold, extract the center position of each feature area, connect the center positions of all feature areas with straight lines to obtain a feature curve, and compare the feature curve with a template curve of a preset brand template to determine whether the feature curve is similar to partial areas of the template curve, if it is determined that the feature curve is similar to partial areas of the template curve, then it is determined that the brand of the mobile phone is the preset brand.

6. The automatic attaching 3D tempered glass screen protector attaching machine of claim 5, wherein the processor is configured to extract the slope of each straight line in the feature curve, combine the slopes into a slope feature vector in order, extract the slope of each straight line in the template curve, combine the slopes into a slope template vector in order, and sequentially extract partial vectors with the same size to the slope feature vector from the slope template vector, calculate the difference between each partial vector and the slope feature vector to obtain multiple differences, and extract the minimum value of multiple differences, if the minimum value is greater than a similar threshold, then it is determined that the feature curve is not similar to partial areas of the template curve after comparing the feature curve with the template curve of the preset brand template, if the minimum value is less than or equal to the similar threshold, then it is determined that the feature curve is similar to partial areas of the template curve after comparing the feature curve with the template curve of the preset brand template.

* * * * *